May 7, 1929.  E. DAPP  1,712,296
MESSAGE CARRYING PARACHUTE
Filed Aug. 7, 1928
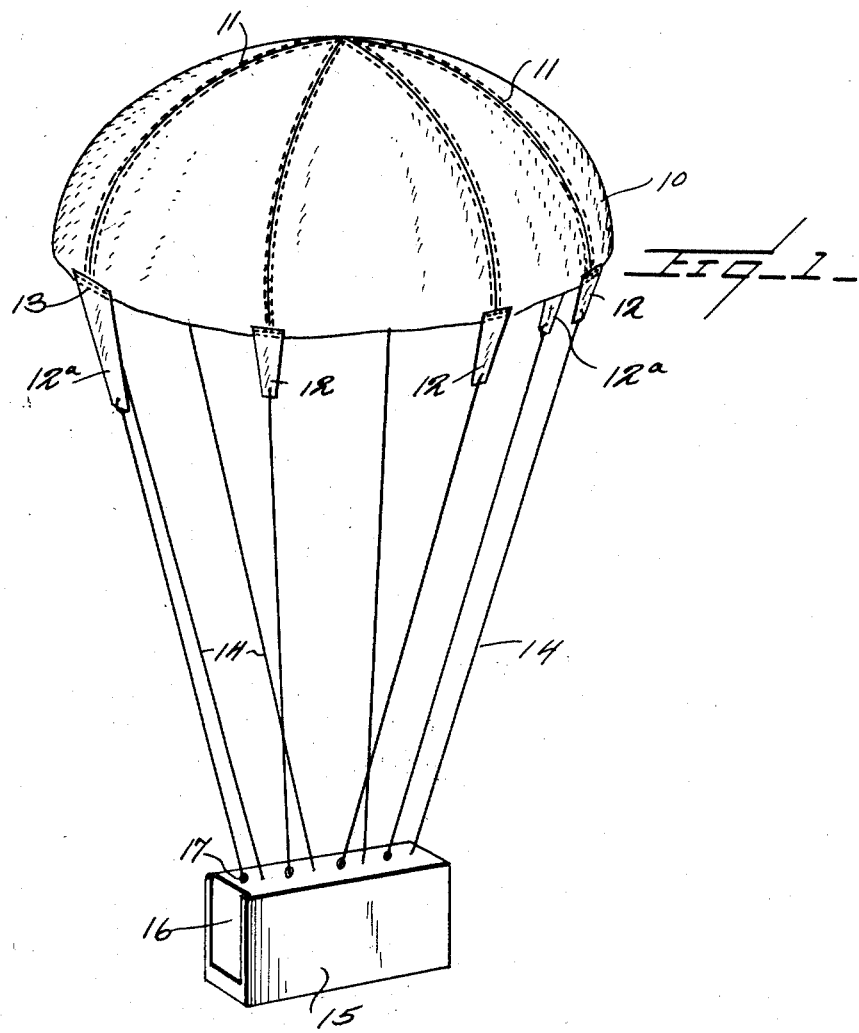
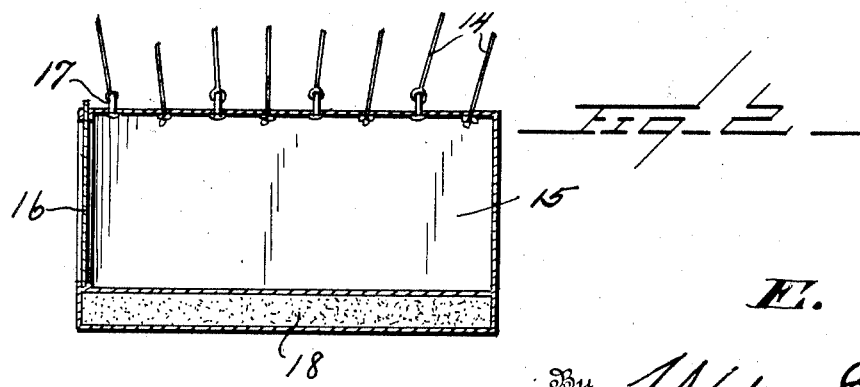
Inventor
E. Dapp
By Watson E. Coleman
Attorney Patented May 7, 1929.

1,712,296

UNITED STATES PATENT OFFICE.

EDWARD DAPP, OF HARRISBURG, PENNSYLVANIA.

MESSAGE-CARRYING PARACHUTE.

Application filed August 7, 1928. Serial No. 298,041.

This invention relates to parachutes and particularly to miniature parachutes designed for use in carrying messages from aircraft in flight to persons on the ground, but also capable of use by children as a toy and exercise.

A further object of the invention is to provide a parachute having attached to it a case or box having a sliding door within which the message or other matter of like nature may be placed and to so connect the cords from the points of the parachute to the box that the parachute shall open properly when tossed out of the aircraft or from a high building, and the parachute shall properly descend.

My invention is illustrated in the accompanying drawings wherein—

Figure 1 is a perspective view of the parachute in use; and

Figure 2 is a vertical sectional view through the car or message carrying case.

Referring to the drawings, 10 designates the body of the parachute which is preferably made of white goods and preferably formed in gores of triangular sections sewed together upon the lines 11.

This device may be very conveniently used for dropping messages from airplanes, dirigibles or high buildings. The box and the parachute itself may be gaily painted so as attract attention. It may be also used as a toy by children.

The parachute is folded or rolled from its top so that when the parachute is tossed into the air, the weight of the car or box will cause it to unroll and open so that there will be no tangling up of the cords. Obviously, the design of the parachute may be changed in many ways without departing from the spirit of the invention.

Thus, for instance, it is obvious that the eyes 17 may be entirely eliminated and the cords 14 attached to the box in any suitable manner, provided the cords are arranged in a line as stated.

The tabs or points 12 I find particularly advantageous in that they help the parachute to open or take the air sooner than it would otherwise do and causes the parachute to open within a few feet from where it is dropped. Without these points or tabs I find that the parachute will not open so quickly.

This parachute tends to save labor and fuel for an aviator, for when an aviator has a message to drop at an air port, this message can be dropped without the aviator stopping and losing time.

The parachute proper 10, may be circular or it may be somewhat oval in shape and attached to the margin of the parachute 10 are a plurality of triangular tabs 12 stitched at 13 to the margin of the parachute, these tabs being preferably of different colors. It will be noted that the tabs at the end of the somewhat oval parachute, and which tabs are designated $12^a$, are somewhat larger than the tabs attached to the side margin of the parachute and attached to these tabs are a plurality of cords 14.

The cords 14 support the casing or box 15, preferably made of metal or other suitable material, which is closed except at one end where the box is temporarily closed by means of a door 16. The box may contain messages or any other matter which it is desired to drop from the parachute. The cords extending from the tabs 12 are attached to the middle portion of the upper edge of the box while the cords extending from the tabs $12^a$ are attached adjacent the ends of the box. Alternate cords are attached to eyes 17 carried by the box, while the remainder of the cords extend through the top of the box and are knotted. The bottom of the box is weighted, as for instance by forming a compartment 18 in which sand is disposed. This box is preferably about six inches long and three inches high and one inch wide.

What I claim is—

1. A toy parachute, comprising a parachute proper, a casing weighted on its bottom and having a door at one end, and cords connecting the margin of the parachute at intervals with the casing, the cords engaging the casing in a single line along the top of the casing, certain of the cords passing through the casing and being knotted and the remainder of the cords engaging eyes on the casing.

2. A miniature parachute of the character described comprising a parachute proper having tabs attached at intervals to its margin, a casing having a door at one end and weighted at its bottom, and cords engaging the tabs and the casing, the cords engaging the casing in a single line extending the length of the casing.

In testimony whereof I hereunto affix my signature.

EDWARD DAPP.